United States Patent
Solis et al.

(10) Patent No.: US 7,328,325 B1
(45) Date of Patent: Feb. 5, 2008

(54) SYSTEM AND METHOD FOR HIERARCHICAL STORAGE MAPPING

(75) Inventors: Eduardo A. Solis, Leander, TX (US); Nicholas R. Graf, Austin, TX (US)

(73) Assignee: Symantec Operating Corporation, Cupertino, CA (US)

( * ) Notice: Subject to any disclaimer, the term of this patent is extended or adjusted under 35 U.S.C. 154(b) by 430 days.

(21) Appl. No.: 10/951,052

(22) Filed: Sep. 27, 2004

(51) Int. Cl.
*G06F 12/00* (2006.01)

(52) U.S. Cl. .................... 711/202; 711/203

(58) Field of Classification Search .............. None
See application file for complete search history.

(56) References Cited

U.S. PATENT DOCUMENTS

| | | | |
|---|---|---|---|
| 6,748,553 B2 | 6/2004 | McBride et al. | |
| 6,785,695 B1 | 8/2004 | Hamilton, II et al. | |
| 6,802,025 B1 | 10/2004 | Thomas et al. | |
| 6,820,214 B1 | 11/2004 | Cabrera et al. | |
| 7,181,578 B1* | 2/2007 | Guha et al. | 711/154 |
| 2004/0054866 A1* | 3/2004 | Blumenau et al. | 711/202 |
| 2004/0085347 A1* | 5/2004 | Hagarty et al. | 345/735 |
| 2004/0243945 A1* | 12/2004 | Benhase et al. | 715/853 |
| 2005/0108375 A1* | 5/2005 | Hallak-Stamler | 709/223 |
| 2006/0015879 A1* | 1/2006 | Wu | 719/310 |
| 2006/0206678 A1* | 9/2006 | Miki | 711/162 |

OTHER PUBLICATIONS

"VERITAS Bare Metal Restore™ Automated System Recovery With VERITAS NetBackup™," White Paper, VERITAS Software Corporation, pp. 1-10, Copyright 2002.

* cited by examiner

*Primary Examiner*—Donald A. Sparks
*Assistant Examiner*—Ngoc Dinh
(74) *Attorney, Agent, or Firm*—Meyertons Hood Kivlin Kowert & Goetzel, P.C.; B. Noël Kivlin

(57) ABSTRACT

A mapping tool for hierarchical storage mapping may include a storage hierarchy representation interface, a command interface and remapping software. The storage hierarchy representation interface may be configured to provide a user with representations of a source storage hierarchy and target storage devices, where the source storage hierarchy may include a source storage device with one or more contained storage devices. The command interface may allow the user to request a hierarchical mapping of the source storage device to one or more target storage devices. The remapping software may be configured to create a mapping of the source storage device and the contained storage devices to storage within the target storage devices.

24 Claims, 13 Drawing Sheets

SYSTEM AND METHOD FOR HIERARCHICAL STORAGE MAPPING

BACKGROUND OF THE INVENTION

1. Field of the Invention

This invention relates to computer systems and, more particularly, to the management of storage resources within computer systems.

2. Description of the Related Art

Many business organizations and governmental entities rely upon applications that access large amounts of data, often exceeding a terabyte or more of data, for mission-critical applications. Often such data is stored on many different storage devices, which may be heterogeneous in nature, including many different types of devices from many different manufacturers.

Various software tools exist for managing and/or modifying the configuration of computer systems within such storage environments. For example, there are tools for managing software configuration (e.g. installing and removing software components as desired) as well as for managing hardware configuration. Configuration tools may include various tools for managing the storage devices in the storage environment, and particularly the mapping of volumes, file systems, and other virtual storage devices to physical storage devices. For example, tools involved in the restoration of a computer system from a backup image as well as tools involved in managing storage configuration on a functioning system (e.g. volume management tools and/or file system tools) may manage the mapping of virtual storage devices to physical storage devices. The virtual and physical storage devices may be managed as a hierarchy of storage devices, where, for example, a disk group may contain numerous disks, a physical disk may contain one or more volumes, and a volume may contain one or more file systems.

In many cases, e.g., as part of recovery after a hardware failure, mapping tools may be used to help restore a saved source storage hierarchy using a new set of target storage devices. The new set of target storage devices may differ from the devices used in the source storage hierarchy configuration: for example, they may differ in size, in functional capabilities such as caching, in performance capabilities, or in supported levels of availability. A mapping tool may provide one or more interfaces, such as a graphical user interface or a command-line interface, allowing a system administrator to select a target storage device for each source storage device that is to be restored (e.g., to select a target disk device onto which a logical volume of the source hierarchy is to be mapped). In addition, the administrator may be required to map devices at each level of a storage hierarchy in a separate step: for example, first map a source disk to a target disk, then map a source volume whose data resides at the source disk to a target volume at the target disk, then map a source file system built using the source volume to a target file system, etc.

In large storage configurations, where a given source storage hierarchy may include hundreds or thousand of storage devices, performing the mapping one device at a time may be time-consuming and error-prone, even in cases where the target storage devices are similar or identical to the storage devices that may have been used in the source storage hierarchy. It may therefore be desirable to provide a tool or a mechanism that supports hierarchical mapping of a source storage hierarchy, i.e., a tool that automatically creates a mapping for a specified source storage device and all its contained storage devices.

SUMMARY OF THE INVENTION

Various embodiments of a system and method for hierarchical storage mapping are disclosed. According to a first embodiment, a mapping tool may include a storage hierarchy representation interface, a command interface and remapping software. The storage hierarchy representation interface may be configured to provide a user with representations of a source storage hierarchy and target storage devices, where the source storage hierarchy may include a source storage device with one or more contained storage devices. For example, the source storage device may be a disk, and the contained storage devices may include logical volumes and/or file systems utilizing storage within the disk. Various other types of source and target storage devices may be specified, such as disk groups, volumes, volume sets and file systems. The command interface may allow the user to request a hierarchical mapping of the source storage device to one or more target storage devices. The remapping software may be configured to create a mapping of the source storage device and the contained storage devices to storage within the target storage devices. Either or both of the interfaces (i.e., the storage hierarchy representation interface and the command interface) may be graphical in nature. For example, the source storage hierarchy may be represented using a first graphical view (e.g., in a window or a panel on a display device), and the target storage devices may be represented in another graphical view. One or more graphical mechanisms may be supported as part of the command interface, such as a "drag and drop" mechanism, a cut and paste mechanism, or a wizard configured to guide a user through a set of steps. A text-based or command-line interface may also be used in place of a graphical user interface.

In one embodiment, the target storage devices may form part of a pre-existing storage hierarchy. For example, one or more disk groups or other storage devices may have been created at a target system prior to an invocation of the mapping tool. The storage hierarchy representation interface may be configured to provide a representation of the target storage hierarchy of the target storage devices, for example in a separate graphical view, panel or window. In another embodiment, a user may specify one or more transformation operations to be applied to the source storage device or to the source storage device and its contained storage devices during the mapping. For example, a user may request that the source storage device and each of its contained storage devices be doubled in size.

The remapping software may be configured to perform one or more validity checks prior to creating the mapping in some embodiments. For example, the remapping software may be configured to verify that the types of devices being specified for mapping are appropriate for the requested mapping to be created: e.g., a request to map a disk group to a volume may be considered invalid. Size requirements (e.g., a requirement that enough space be available within targeted storage devices to contain the data of source storage devices) may also be used to determine whether a requested mapping is valid. In addition, containment-related requirements (e.g., whether a source storage device is fully contained within the specified source storage device) and name space collisions (e.g., whether a source storage device has a name identical to a pre-existing target storage device), and various user-specified validity requirements, may also be used in determining the validity of a requested hierarchical mapping. If a requested mapping is found to be invalid, an indication of invalidity may be provided to the user.

Several other embodiments are also disclosed. According to another embodiment, a system may include a source storage hierarchy, one or more target storage devices, and a mapping tool. The source storage hierarchy may include a source storage device (e.g., a disk) with one or more contained storage devices (e.g., a volume). The mapping tool may be configured to create a mapping of the source storage device and its contained storage devices to the target storage devices in response to a request for a hierarchical mapping.

Figure 1:
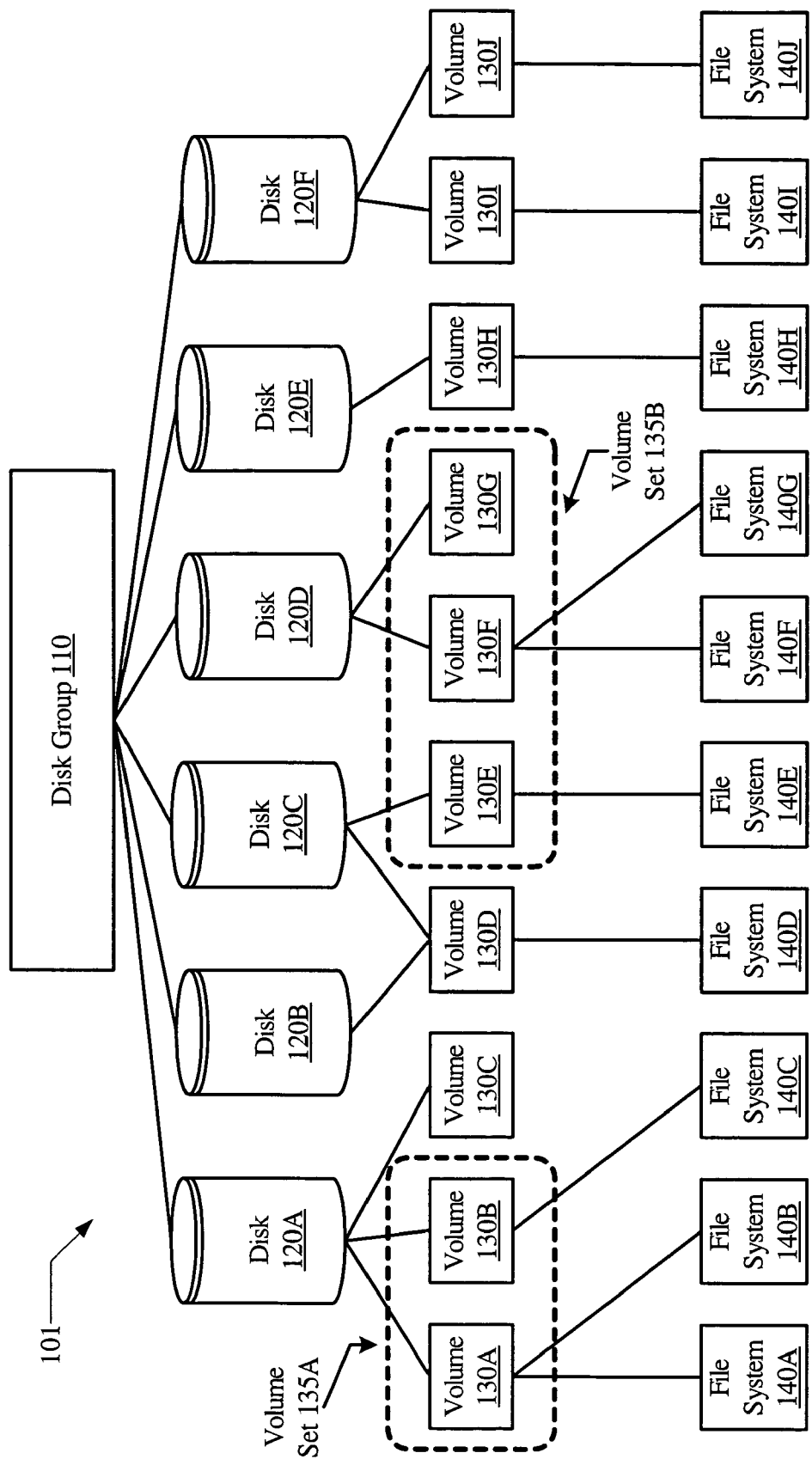
FIG. 1 is a block diagram illustrating a storage hierarchy according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating an exemplary storage hierarchy 101 according to one embodiment. Storage hierarchy 101 includes a disk group 110, disks 120A-120F, volumes 130A-130J, and file systems 140A-140J. A disk group 110 may be a named collection of disks 120 managed as a group. Disk group 110 may contain disks 120A-120F (collectively, disks 120), and each disk 120 may contain part or all of a logical volume 130 (i.e., logical volumes 130A-J, which may also be termed volumes 130). For example, disk 120A may contain volume 130A-C, disk 120C may contain volume 130E, disk 120D may contain volumes 130F and 130G, etc. Volume 130D may span two disks, 120B and 120C; that is, only part of volume 130D may be contained within a single disk 120B or 120C. In one embodiment, a disk array device may also be represented as a single object within storage hierarchy 101, e.g., simply as a larger disk 120; while in other embodiments, each disk of a disk array may be represented as a separate storage device. Each file system 140 (i.e., file systems 140A-140J) may be contained within a given volume 130, while some volumes, such as volume 130C, may not contain any file system. In some embodiments, a collection of volumes (such as volumes 130A and 130B) may be designated and referred to collectively as a named volume set, for example for administrative purposes. In the illustrated example, volumes 130A and 130B are contained in volume set 135A, while volumes 130E, 130F and 130G are contained in volume set 135B. It is noted that in certain embodiments, a volume set may be restricted to contain a single file system.

Storage hierarchy 101 may represent the organization of storage of a given storage client or clients running one or more applications. For example, in one embodiment storage hierarchy 101 may represent the storage organization for a database application, where one subset of volumes 130 and file systems 140 may be used for a collection of database tables, a second subset for database indexes, a third for database recovery logs, etc. For a variety of reasons, it may be desirable to save a representation of storage hierarchy 101 and to recreate the logical organization represented by storage hierarchy 101 by mapping the virtual storage devices such as volumes 130 and file systems 140 at a target set of physical storage devices (i.e., disks and/or disk groups). Storage hierarchy 101 may be referred to as a source storage hierarchy for the mapping. The target set of physical storage devices may consist of the same physical storage devices (e.g., disks 120 of disk group 110) that were used in the source storage hierarchy 101, or of different physical storage devices. For example, in one embodiment, the representation of storage hierarchy 101 may be saved as part of, or along with, a data backup operation for the storage client, and the logical organization may be recreated as part of a system restore operation using the same or different storage hardware, as described in further detail below in conjunction with the description of FIG. 2. In another embodiment, the representation of logical hierarchy 101 may be saved and restored by a frozen image server or other provider of point-in-time copies of application data using different physical storage devices, or by a tool supporting migration or remote replication of application data, also using different physical storage devices. Various other tools and/or service providers may also utilize a saved representation of storage hierarchy 101 in order to recreate the logical relationships of file systems, volumes and physical storage devices depicted in FIG. 1.

Figure 2:
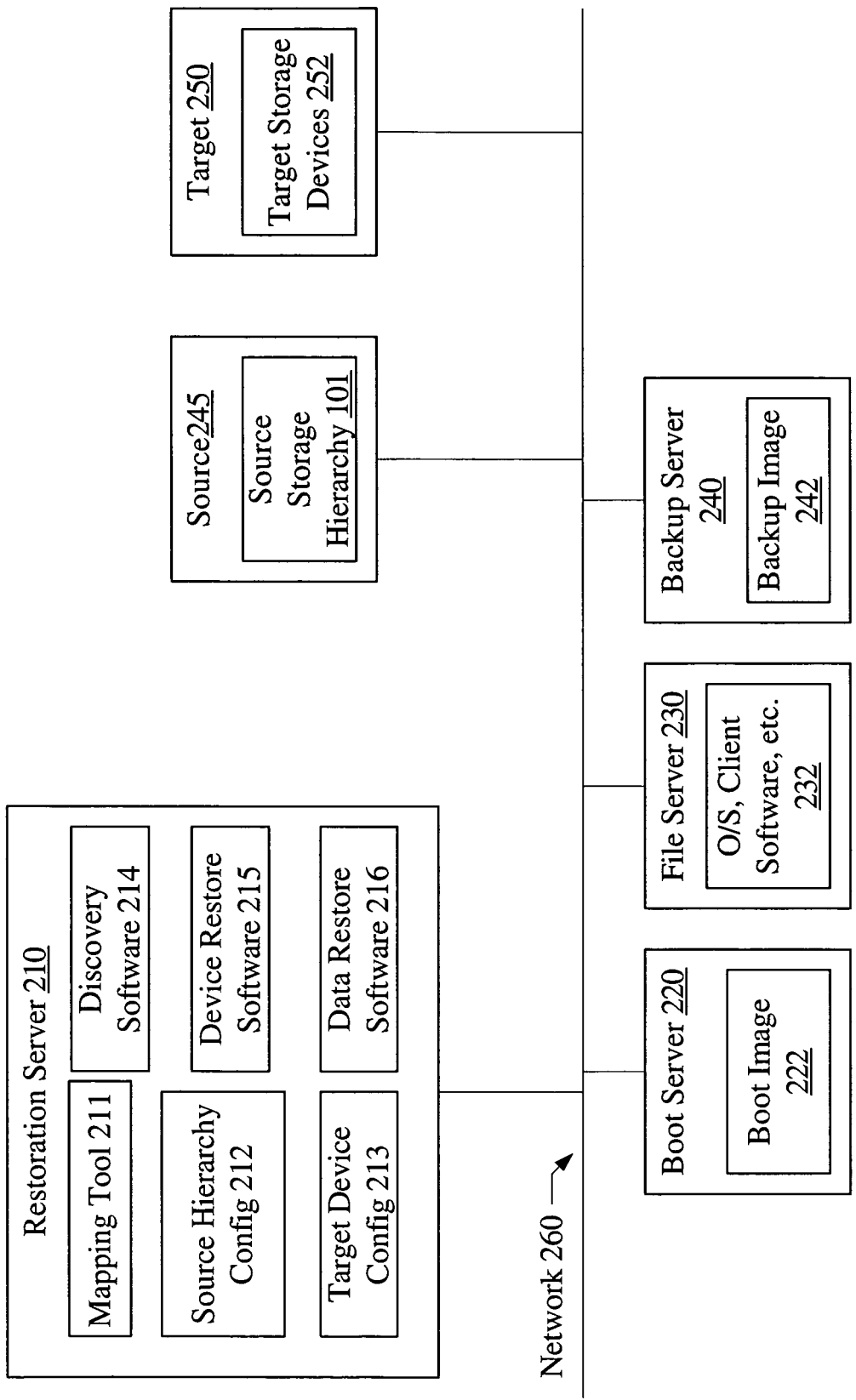
FIG. 2 is a block diagram of one embodiment of a system comprising several servers and a source and a target of a system restoration operation.

FIG. 2 is a block diagram of one embodiment of a system comprising several servers and a source and a target of a system restoration operation. In the illustrated embodiment, a restoration server 210, a boot server 220, a file server 230, a backup server 240, a source 245 and a target 250 are shown coupled to a network 260. Source 245 may comprise a computer system, including a source storage hierarchy 101, that is to be restored using target devices 252 by servers 210, 220, 230 and 240. (In some embodiments, as noted above, the source and target for a restoration operation may be the same system, and may include the same storage devices such as disks.)

The data of source 245 may have been backed up in a backup image 242 at backup server 240. The data may have been backed up from source 245 previously, and may be restored due to a failure at the source 245 (either hardware, software, or a combination thereof) or other loss of the data at the source 245. The backup server 240 may implement any backup solution (e.g. the VERITAS NetBackup™ product from VERITAS Software Corporation, or any other VERITAS backup product or backup product from any other vendor).

At the time the backup is performed, a record may be made of the system configuration of source 245, including the configuration of source storage hierarchy 101. The record or representation of source hierarchy 101 is illustrated as source hierarchy configuration 212 at restoration server 210 in FIG. 2. Restoration server 210 may implement any system restoration solution (e.g., the VERITAS Bare Metal Restore™ product from VERITAS Software Corporation). The record of system configuration of source 245 may be maintained in a variety of forms in different embodiments, and may include other information (e.g., networking and processor-related configuration information), in addition to storage hierarchy information. For example, in some embodiments a persistent version of source hierarchy configuration 212 may be maintained in a database, while in others the configuration information may be stored as an XML file, which may be termed a client configuration file. In some embodiments, source hierarchy configuration 212 may also be part of backup image 242 (i.e., in addition to being stored independently in a database or a client configuration file), while in other embodiments source hierarchy configuration 212 may be stored only as part of the backup image 242 and may be retrieved by the restoration server 210 when a restoration is to be performed. Source hierarchy configuration 212 may be created by restoration server 210, or by client software at source 245, or by a combination of server and client software.

Source hierarchy configuration 212 may include sufficient information to reproduce or restore the relationships between various storage objects and devices depicted in FIG. 1, such as disk groups 110, disks 120, volume sets 135, volumes 130 and file systems 140. For example, source hierarchy configuration 212 may include the number, type, and size of storage devices in source storage hierarchy 101. The layout of volumes 130 on disks 120 (e.g., starting offsets, extent sizes, etc.), and various attributes of the volumes, e.g., block size, striping configuration, stripe unit size, etc., may also be included in source hierarchy configuration 212.

File server 230 may provide various software resources (reference numeral 232) used during the restore process, which may include operating system software (e.g. operating system commands and libraries), restoration client software, backup client software, etc. File server 230 may implement any file system usable over a network (e.g. network file system (NFS), Server Message Block (SMB) for Microsoft Windows™ or Samba for Unix-like implementations, etc.). Boot server 220 may be used to provide a boot image 222 to target 250. When target 250 is booted to perform a restore, it may use standard network boot protocols to boot using boot image 222. Boot image 222 may include a customized boot procedure created by restoration server 210 to restore target 250 to the state corresponding to the backup image 242 (including the data in backup image 242, along with the configuration of the source 245 at the time of the backup). In some embodiments, a media boot may be supported in which the boot image 222 and software resources 232 are stored on a computer accessible medium such as a compact disc, and the disc is used to boot the target 250. In such embodiments, boot server 220 and file server 230 may be eliminated.

In one embodiment, each of restoration server 210, boot server 220, file server 230, and backup server 240 may comprise computer systems configured to execute the corresponding server software. In some embodiments, one or more of the servers 210, 220, 230, and 240 may be combined onto the same physical computer system, as desired.

As illustrated in FIG. 2, restoration server 210 may include a mapping tool 211, discovery software 214, device restore software 215, and data restore software 216. Discovery software 214 may be used to identify target storage devices 252 at target 250 (e.g., after target 250 is booted), and to create a representation of the target device configuration 213. As described below in further detail, mapping tool 211 may be configured to provide representations of source storage hierarchy 101 and target storage devices 252, accept requests for mapping a source storage device to target storage devices, and perform the requested mapping. In some embodiments, mapping tool 211 may be executed on the restoration server 210, while in other embodiments, part or all of mapping tool 211 may execute elsewhere (e.g. at a client workstation). Once a mapping has been successfully created, restoration server 210 may provide the mapping to device restore software 215, allowing device restoration software to create the desired set of virtual storage devices (e.g., volumes and/or file systems) at target storage devices 252. The created storage devices may then be populated with data, e.g., restoration server 210 may use data restore software 216 to copy the data from backup image 242 to target storage devices 252.

Figure 4:
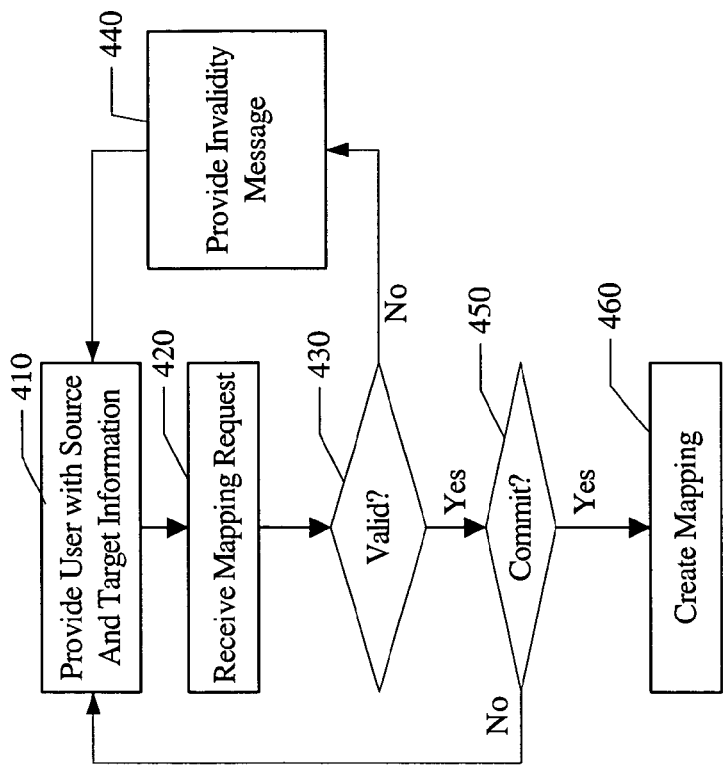
FIG. 4 is a flow diagram illustrating aspects of the operation of mapping tool depicted in FIG. 3.
Figure 3:
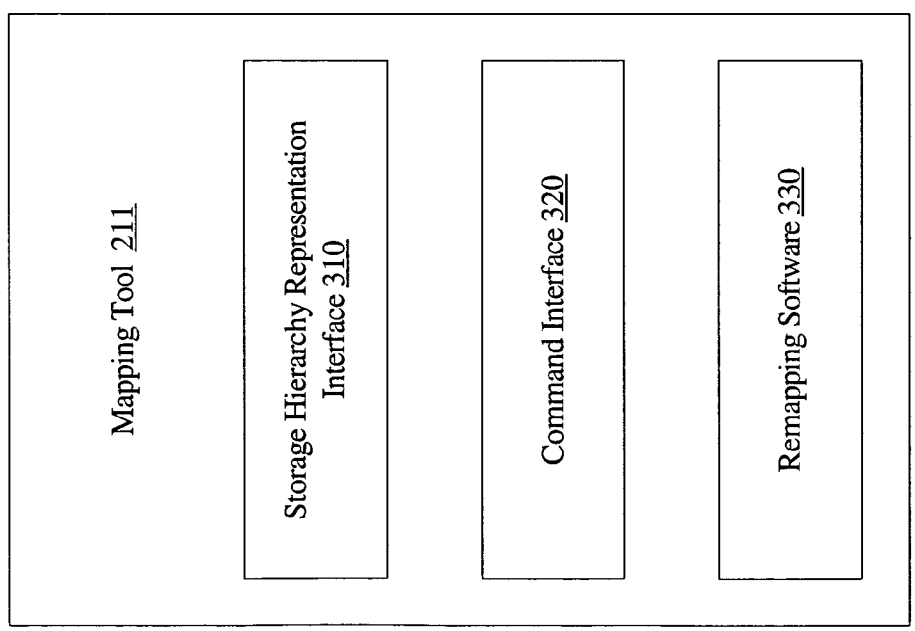
FIG. 3 is a block diagram illustrating components of one embodiment of a mapping tool.

FIG. 3 is a block diagram illustrating components of one embodiment of mapping tool 211, and FIG. 4 is a flow diagram illustrating aspects of the operation of mapping tool 211 depicted in FIG. 3. As shown in FIG. 3, mapping tool 211 may include storage hierarchy representation interface 310, a command interface 320, and remapping software 330. Storage hierarchy representation interface 310 may be configured to provide a user with representations of source storage hierarchy 101 and target storage devices 252 (block 410 of FIG. 4), corresponding to source hierarchy configuration 212 and target device configuration 213, respectively. Command interface 320 may be configured to allow a user to request a hierarchical mapping of any specified storage device or object (e.g., disk group 110, disks 120, volume sets 135, or volumes 130) represented within source hierarchy configuration 212 to storage within target storage devices 252. Upon receiving the request (block 420 of FIG. 4), in some embodiments remapping software 330 may be configured to verify the validity of the request (block 430) based on one or more validity requirements. If the request is determined to be valid, remapping software 330 may allow the user to request that the mapping be committed (block 440) before performing the requested hierarchical mapping (block 460) of the storage device specified in the request. As part of performing the hierarchical mapping, remapping software 330 may map one or more contained storage devices of the specified storage device (such as volumes 130 and file systems 140 if the specified storage devices is a disk 120) to storage within target storage devices 252. If the request is found to be invalid, remapping software 330 may be configured to provide an invalidity indication or message to the user (block 440). Further details on the steps shown in FIG. 4 are provided below.

In some embodiments, one or both of storage hierarchy representation interface 310 and command interface 320 may be graphical user interfaces. In one such embodiment, storage hierarchy representation interface 310 may provide a graphical view of source storage hierarchy 101 using source hierarchy configuration 212, and another graphical view of target storage devices 252 using target device configuration 213. Command interface 320 may provide a graphical mechanism for specifying a source storage device of source storage hierarchy 101 and one or more target storage devices 252 to which source the specified source storage device and its contained devices are to be mapped. For example, the source storage hierarchy 101 and the target storage devices 252 may be displayed in separate panels within the same window. Alternatively, the source storage hierarchy and the target storage devices may be displayed in separate windows, which may be moved, resized, etc. separately and which may be permitted to overlap each other on the display screen.

Figure 5:
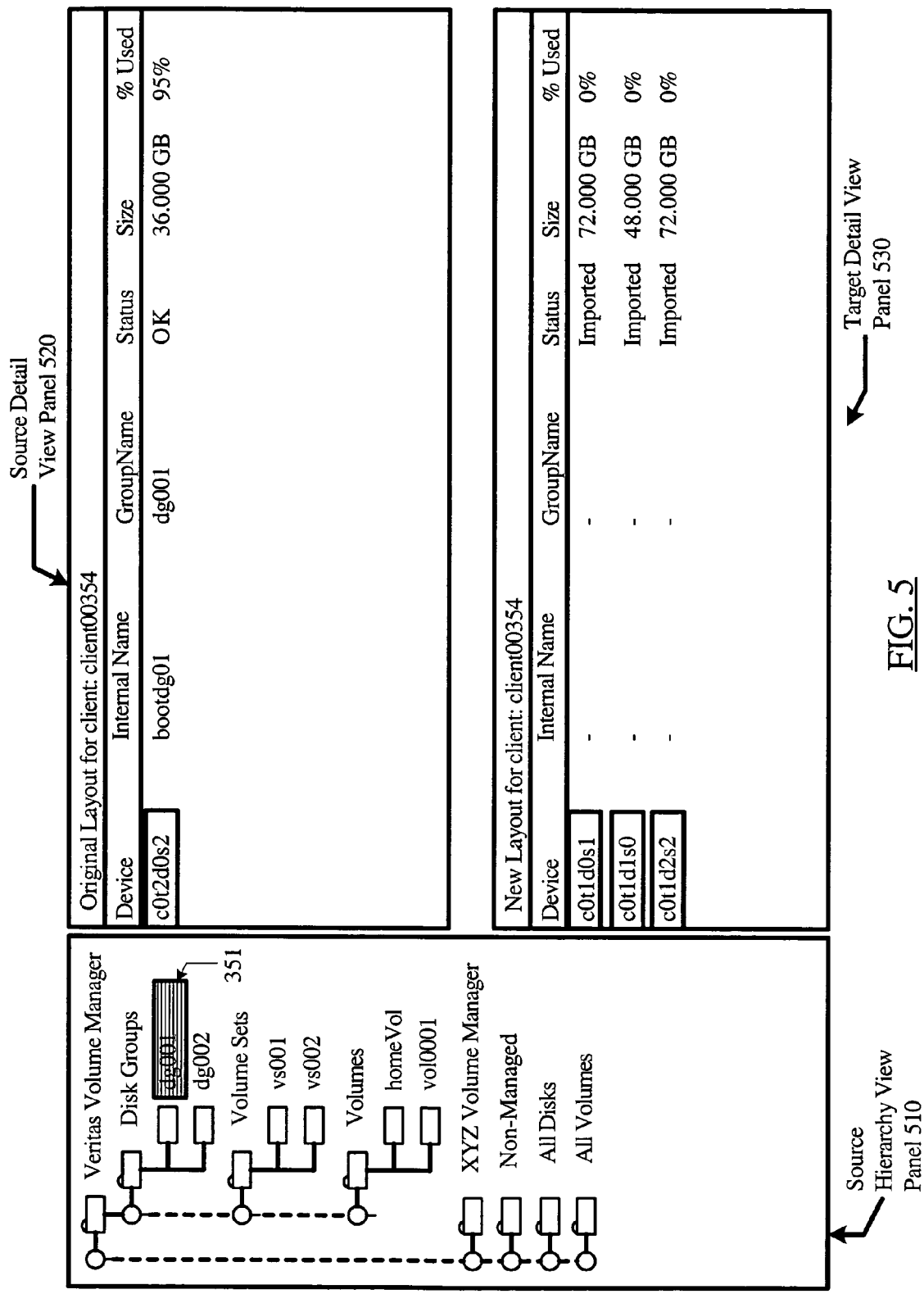
FIG. 5 is a block diagram illustrating an exemplary set of graphical views that may be provided by a mapping tool according to one embodiment.

FIG. 5 is a block diagram illustrating an exemplary set of graphical views that may be provided by mapping tool 211 as part of a graphical user interface according to one embodiment. Source storage hierarchy 101 may be represented in source hierarchy view panel 510, and target storage devices 252 may be represented in target detail view panel 530. A subset of target storage devices 252, or all displayed target storage devices 252, may be selected for the requested mapping. Details for a selected node or element (e.g., element 551 representing a disk group "dg001" in the illustrated embodiment, whose selected status is indicated by horizontal lines) may be displayed in source detail view panel 520.

Storage objects and devices of source storage hierarchy 101 may be organized using a variety of classification techniques in different embodiments. In the illustrated embodiment, storage devices managed by different volume managers (e.g., the VERITAS Volume Manager™ from VERITAS Software Corporation, and the "XYZ" Volume Manager) may be represented as different display hierarchies (e.g., hierarchies rooted at the "Veritas Volume Manager" icon and the "XYZ Volume Manager" icon, respectively). As shown in FIG. 5, separate display hierarchies may also be provided for non-managed devices (i.e., devices that may not be managed by any volume manager), for all the disks in source 245, and for all volumes in source 245. A given storage device such as a disk 120 may appear in more than one display hierarchy of source hierarchy view panel 510 in some embodiments: for example a disk 120 may appear in the "Veritas Volume Manager" display hierarchy, as well as in the "All Disks" display hierarchy. The number and organization of display hierarchies within source hierarchy view panel 510 may differ in different embodiments. For example, entities displayed within source hierarchy view panel 510 may include "Logical Volume Manager", "Solaris Volume Manager", "Logical Disk Manager", "Disk Sets", "Volume Groups", "Transactional Volumes", "Dynamic Disks", etc., for different operating systems, such as Solaris, HP-UX, AIX, Linux, and Windows™.

In some embodiments one or more elements of a storage hierarchy, similar to the elements of storage hierarchy 101, may have been created at target 250 prior to the time at which mapping tool 211 is used to request a hierarchical mapping. For example, the disks 120 available at target 250 may have been configured as one or more disk groups 110, volumes 130 and/or volume sets 135 may have been created at the disks, etc. In some embodiments where an existing system (rather than a new system being configured for the first time) is used as a target 250, a complete storage hierarchy 101, including disk groups 110, disks 120, volumes 130, volume sets 135 and file systems 140 may exist at target 250 prior to the use of mapping tool 211. Discovery software 214 may be configured to identify such pre-existing storage devices and any pre-existing storage hierarchies 110 and provide configuration information for such devices and/or hierarchies to mapping tool 211 as part of target device configuration 213.

Figure 6:
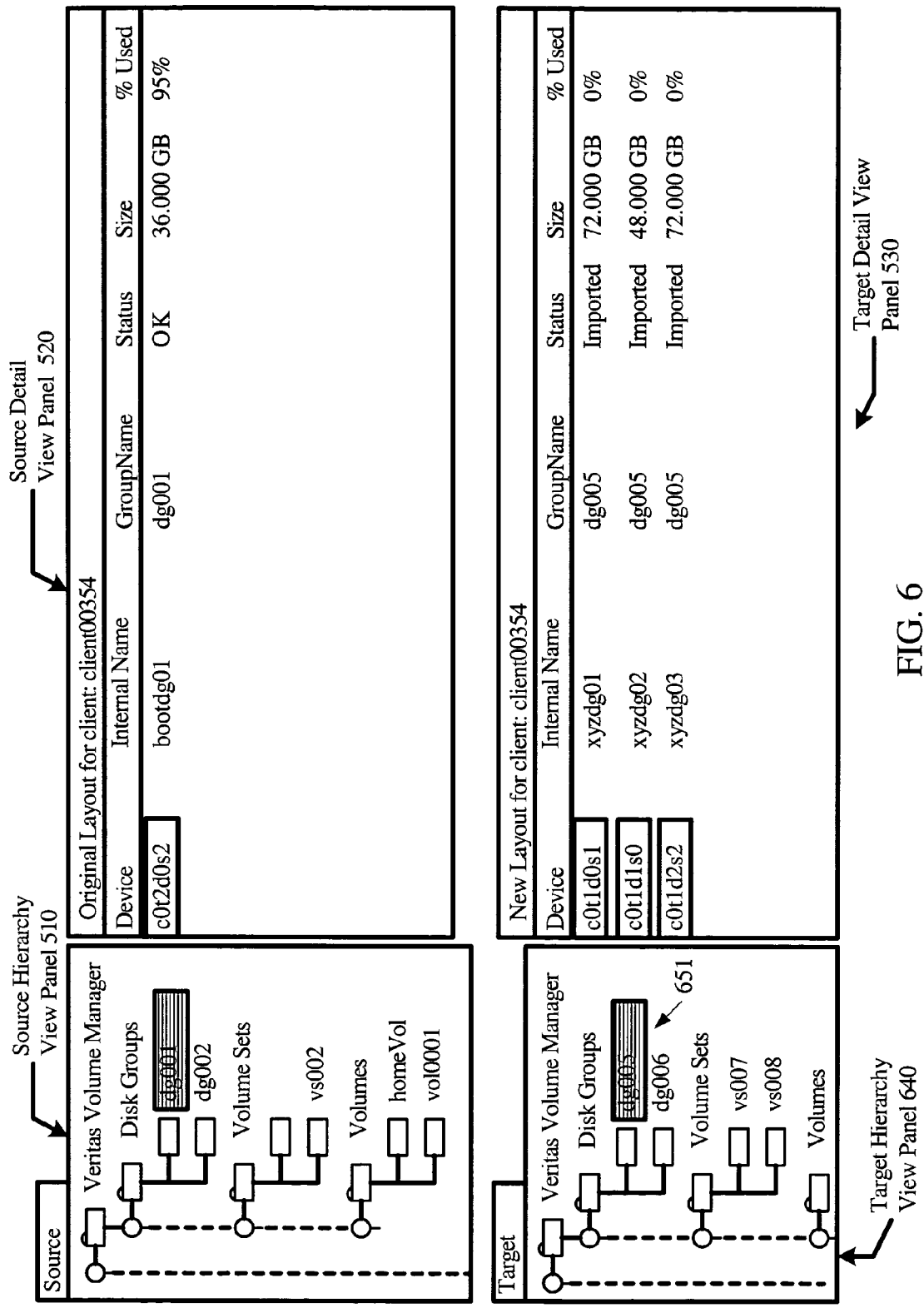
FIG. 6 is a block diagram illustrating another exemplary set of graphical views, including a target hierarchy display panel, that may be provided by a mapping tool according to one embodiment.

In such embodiments, in addition to showing the target storage devices in target detail view panel 530 as illustrated in FIG. 5, mapping tool 211 may also be configured to display target storage hierarchies. FIG. 6 is a block diagram illustrating an exemplary set of graphical views, including a target hierarchy display panel 640, that may be provided by mapping tool 211 according to one such embodiment. As shown in FIG. 6, pre-existing disk groups such as "dg005" and "dg006", and pre-existing volume sets such as "vs007" and "vs008" may be displayed in target hierarchy display panel 640. Details for a selected node or element from target storage hierarchy panel 640 (e.g., element 651 representing disk group "dg005" in the illustrated embodiment, whose selected status is indicated by horizontal lines) may be provided within target detail view panel 530. When a hierarchical mapping is requested from a source storage device to one or more target storage devices that form part of a pre-existing storage hierarchy, there may be a potential for name space collisions, e.g., one or more source storage devices such as volumes 130 may have the same names as pre-existing volumes within target storage devices 252. Further details about techniques used within mapping tool 211 in the event of name space collisions are provided below.

Command interface 320 of mapping tool 211 may provide one or more mechanisms for specifying a source storage device and one or more target storage devices 252 to which the source storage device (and storage devices contained within the source storage device) should be mapped. For example, in embodiments where command interface 320 is a graphical user interface, a "drag and drop" mechanism may be supported. In a drag and drop mechanism, a user may use a user interface device to select a graphical element and to either move the graphical element to another location on the screen or make a copy of the graphical element in the other location on the screen by manipulating the user interface tool to indicate the other location. In some embodiments, the selected graphical element may move around the screen in response to manipulations of the user interface tool, providing the visual effect of "dragging" the graphical element around the screen.

The user interface device for a "drag and drop" mechanism may be a mouse in some embodiments. The user may select the graphical element by depressing the "left" mouse button while a cursor on the screen (controlled by mouse movements) is over the graphical element. The user may hold the left button down and move the mouse until the cursor is over the desired location. Releasing the mouse button may "drop" the graphical element at the desired location. In other embodiments, other devices may be used. For example, a touch pad that responds to user touch may be used to move the cursor around on the screen (and/or taps on the touch pad may be used in place of the mouse button clicks). In still other embodiments, a display screen that responds to user touch may be a user interface device. Arrow keys or other keys on a keyboard may be used as a user interface device (with each key or key combination indicating a direction of movement on the screen).

Figure 7:
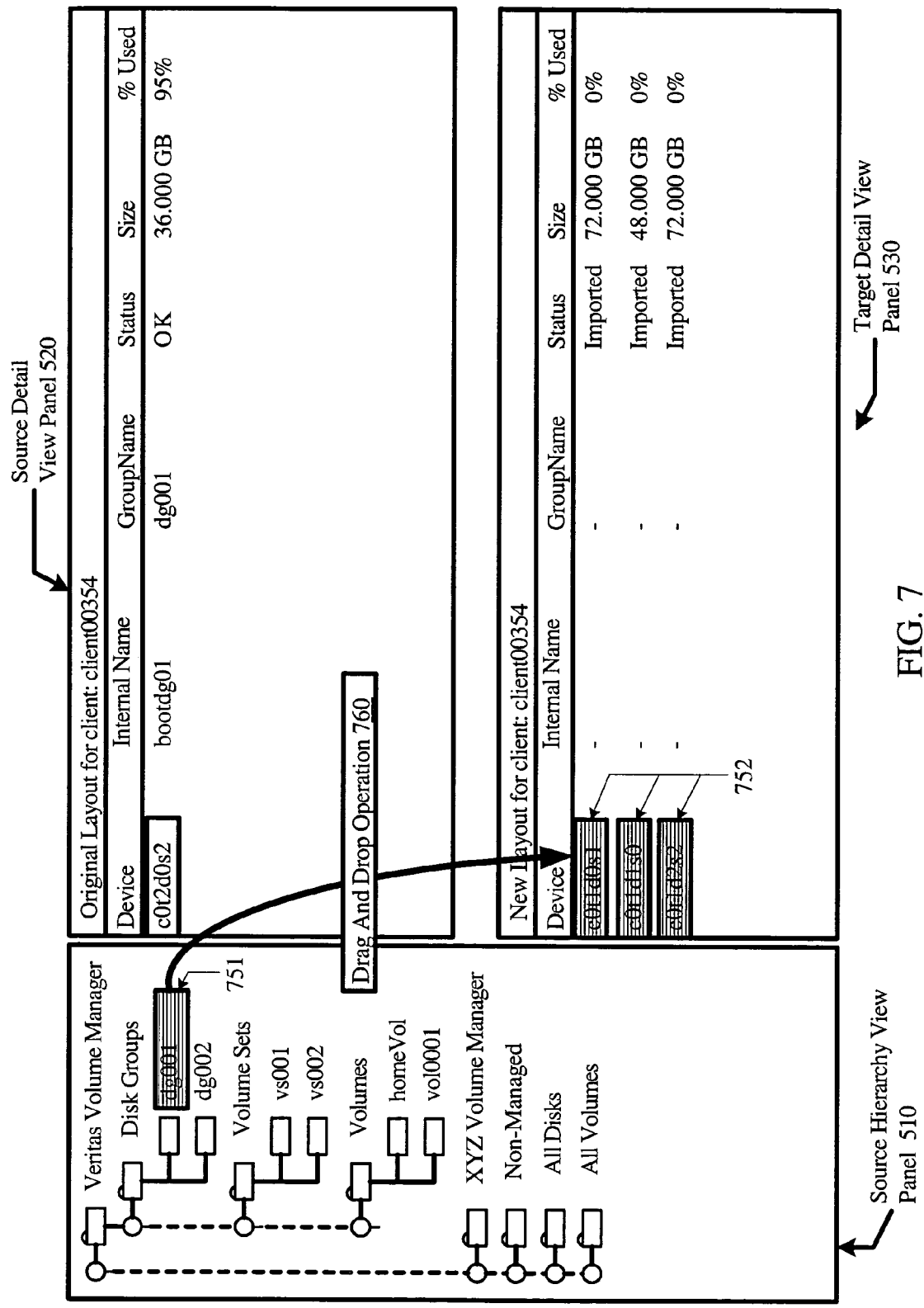
FIG. 7, FIG. 8, FIG. 9 and FIG. 10 are block diagrams illustrating examples of drag and drop operations that may be performed in different embodiments to specify a hierarchical mapping request.
Figure 8:
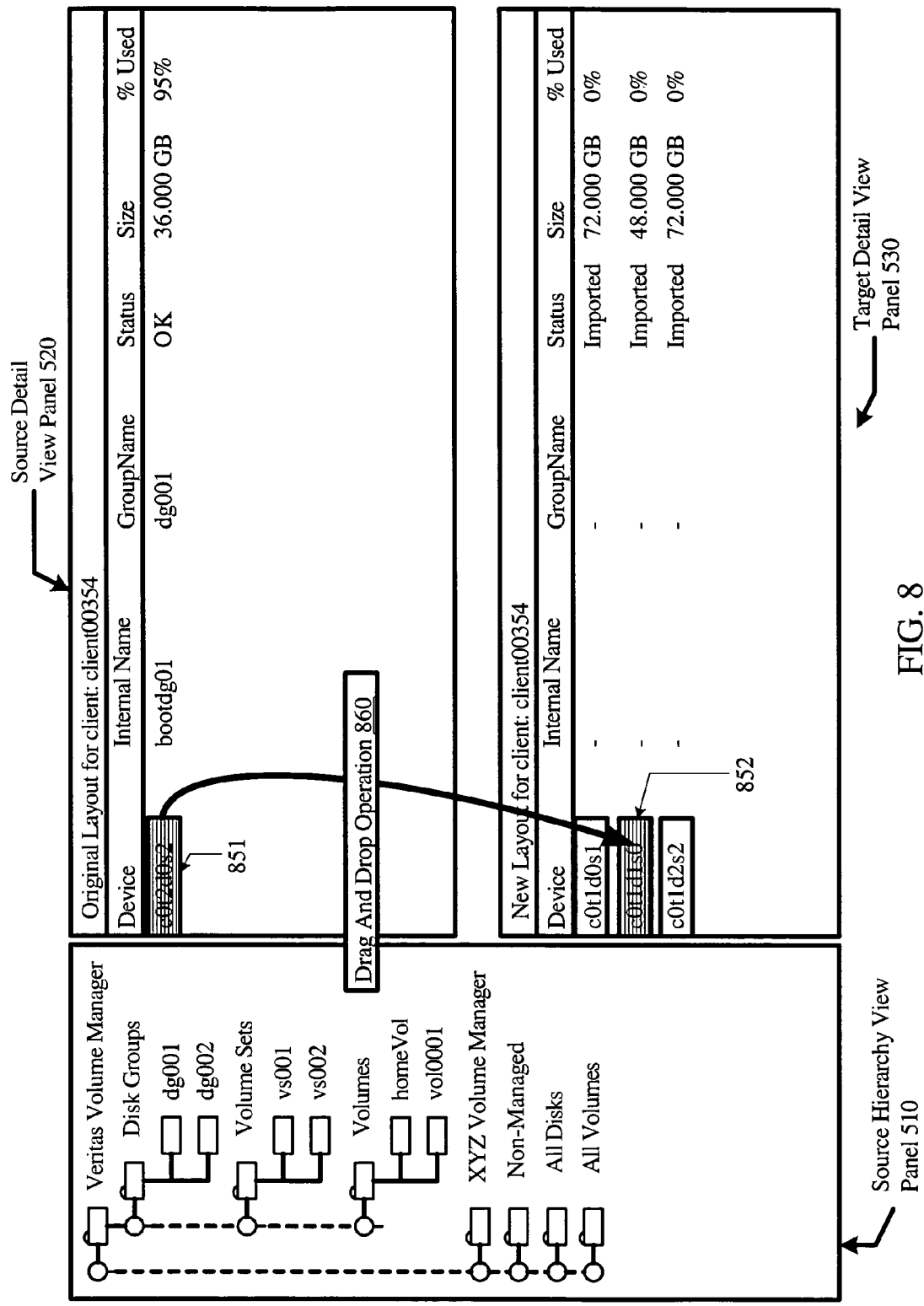
Figure 9:
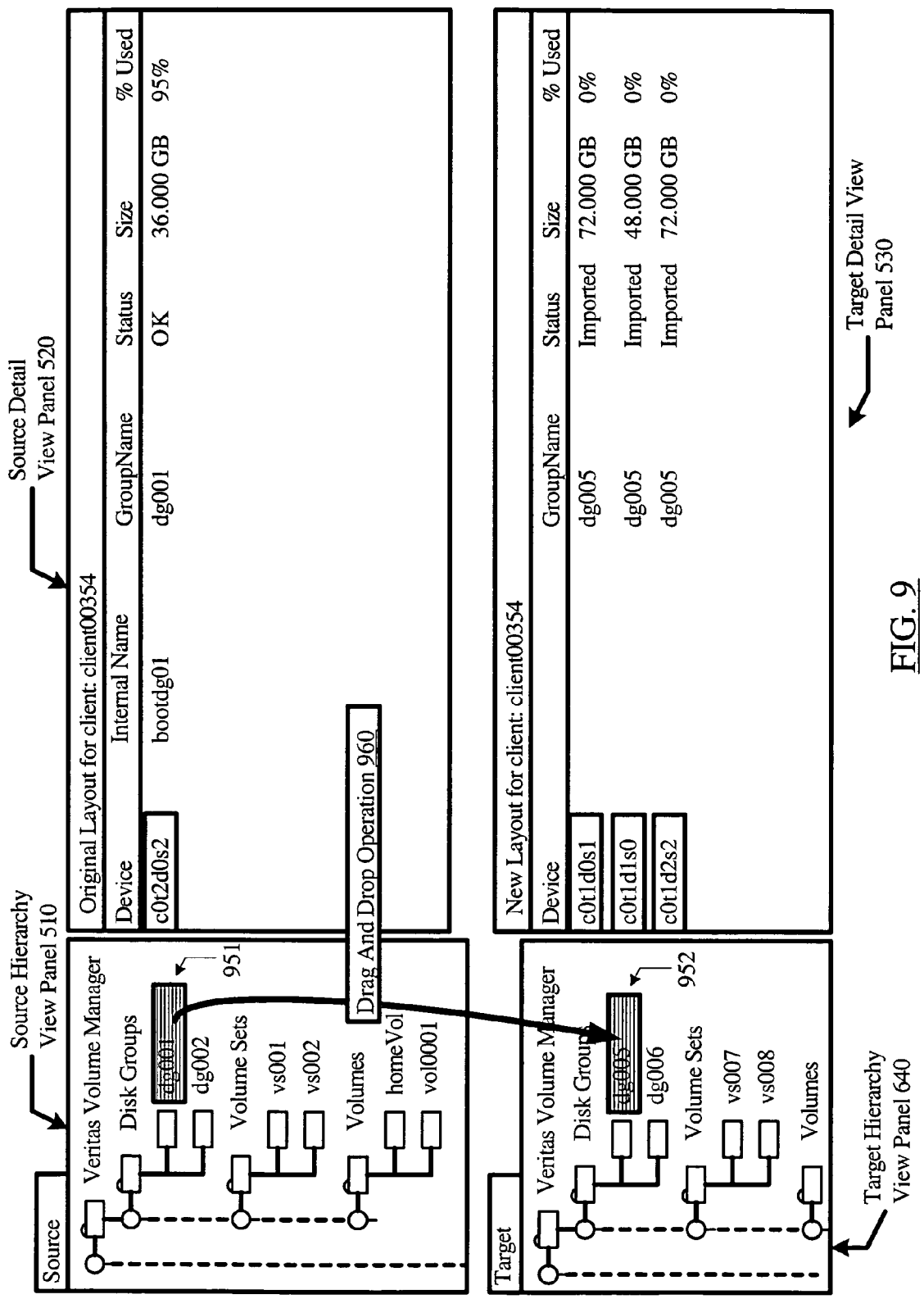
Figure 10:
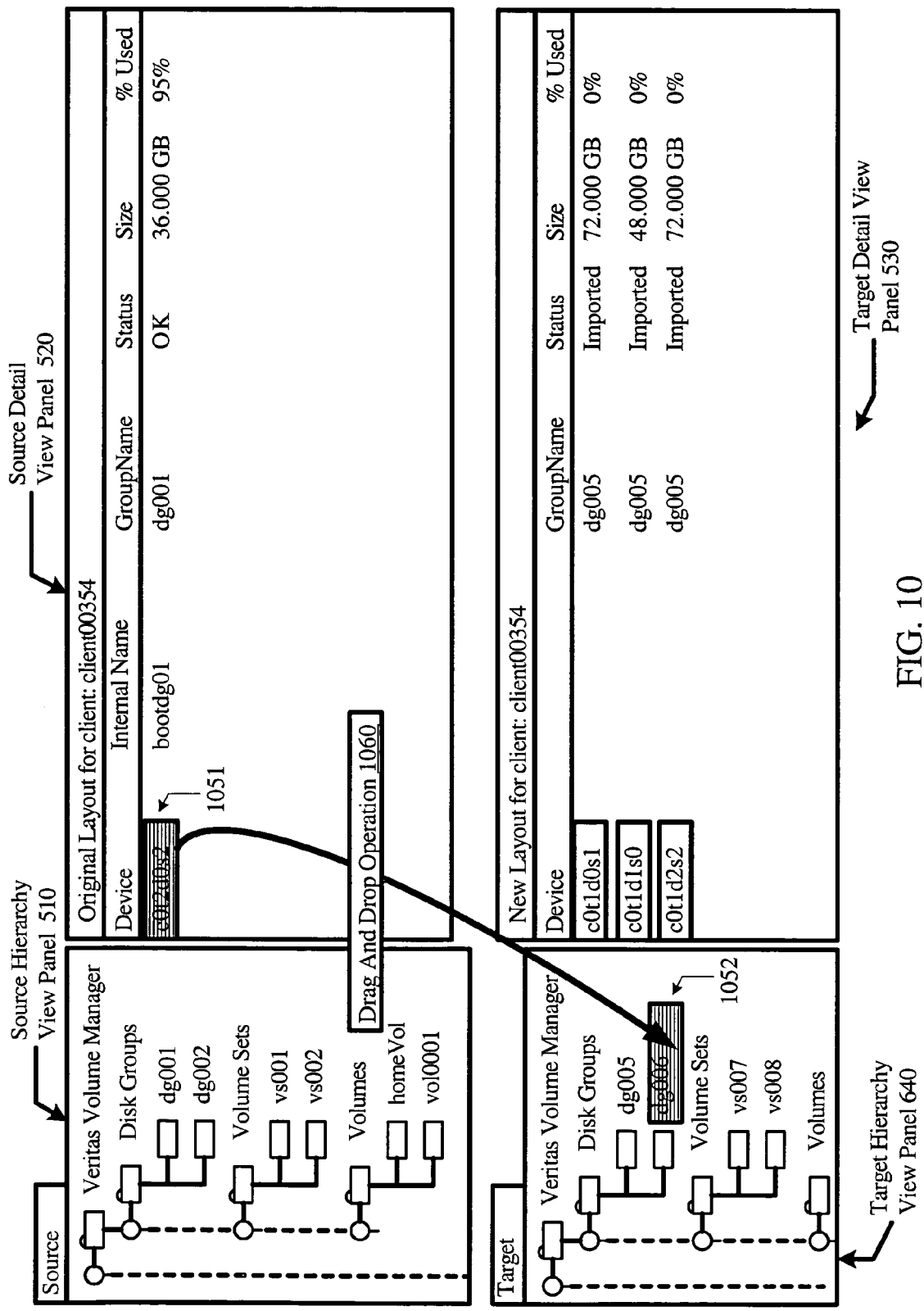

FIG. 7, FIG. 8, FIG. 9 and FIG. 10 are block diagrams illustrating examples of drag and drop operations that may be performed to specify a hierarchical mapping request in embodiments where command interface 320 is a graphical user interface. As shown in FIG. 7, a set of target storage devices 752, such as disks "DiskL", "DiskM" and "DiskN", may be selected by a user from target detail panel 530, for example using a left mouse button as described above. The user may then select a source storage device 751, such as disk group "dg001", from source hierarchy view panel 510, and perform a "drag and drop" operation 760 to request that the source storage device be mapped hierarchically to the target storage devices 752. Source storage devices may also be selected from source detail view panel 520, as shown in FIG. 8, where a source storage device 851 (disk "DiskA") is dragged and dropped via operation 860 to a target storage device 852 (disk "DiskM") in target detail panel 530. In embodiments such as those depicted in FIG. 6, where elements of a target storage hierarchy are displayed, target storage devices may also be selected from target hierarchy view panel 640, as shown in FIG. 9 and FIG. 10. For example, as shown in FIG. 10, a source storage device 951 (e.g., disk group "dg001") from source hierarchy view panel 520 may be dragged and dropped onto a target storage device 952 (e.g., disk group "dg005") in target hierarchy view panel 640 via drag and drop operation 960. Similarly, as shown in FIG. 10, a source storage device 1051 (e.g., disk "DiskA") from source detail hierarchy view 520 may be dragged and dropped onto a target storage device 1052 (e.g., disk group "dg006") in target hierarchy view panel 640 via a drag and drop operation 1060. Thus, a source storage device may be selected from either source hierarchy view panel 510 or source detail view panel 520, and may be dragged and dropped onto one or more selected target storage devices shown in either target hierarchy view panel 640 or target detail view panel 530 in order to request a hierarchical mapping. Operations performed by mapping tool 211 after the source and target storage devices have been specified, e.g., validity checks and mapping commit operations, are described below in further detail.

Other embodiments may support other graphical mechanisms for specifying source and target storage devices for a hierarchical mapping request. For example, a copy and paste mechanism may be used in which a graphical element is selected, copied to a temporary memory such as the "clipboard" in Windows systems, a target location in the new configuration is selected, and the copied graphical element is pasted from the temporary memory to the target location. Selecting of graphical elements and target locations may, e.g., be performed using the tab key on a keyboard or the mouse. Copying and pasting may be accomplished, e.g., using a key stroke, a combination of key strokes, or a menu selection.

Figure 11:
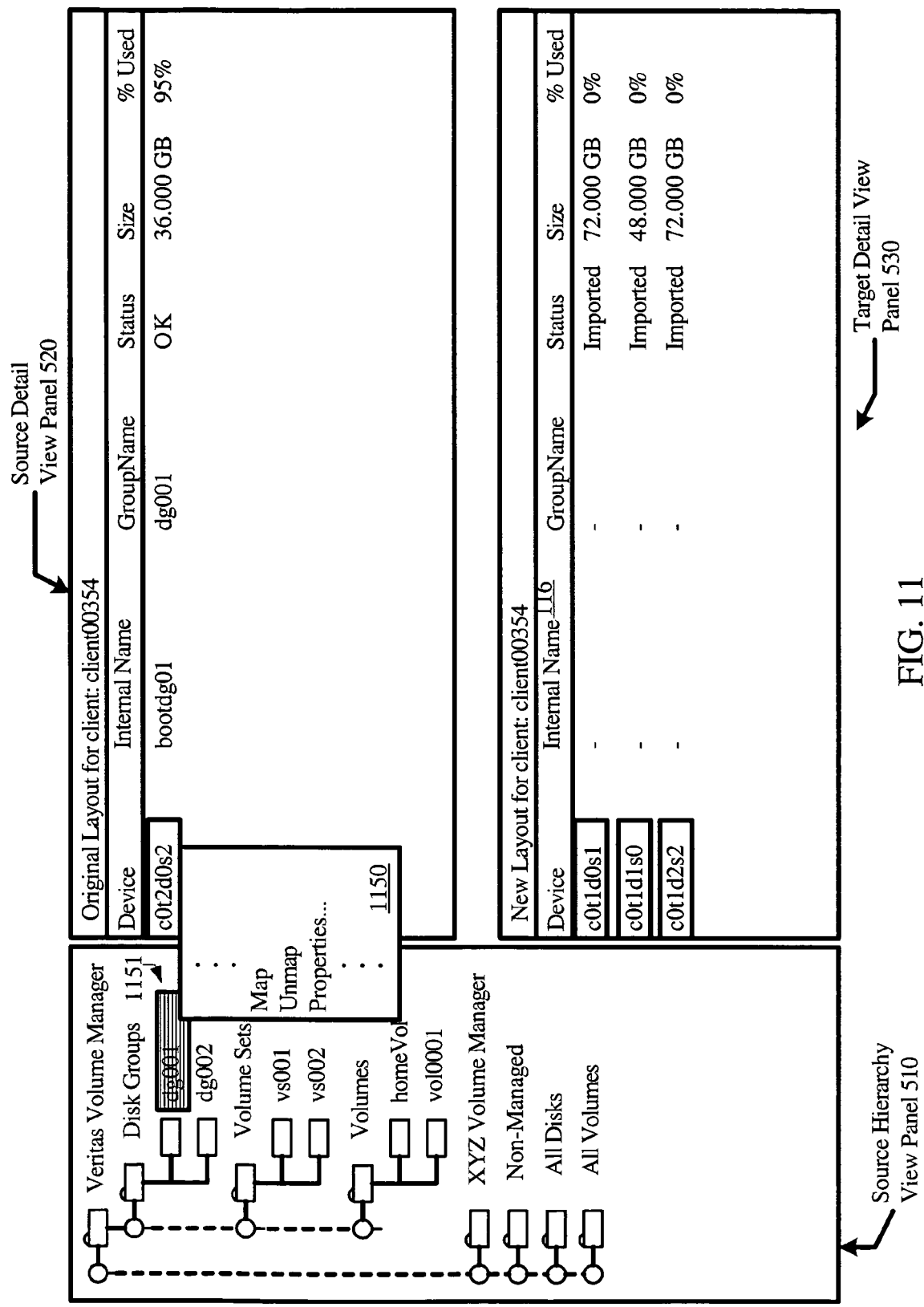
FIG. 11 is a block diagram illustrating a launch of a wizard for requesting a hierarchical mapping according to one embodiment.

In another embodiment, a wizard may be provided for specifying source and target storage devices. As used herein, a wizard may comprise software code which displays a set of steps as a series of windows, guiding the user through various choices to complete a configuration action. FIG. 11 is a block diagram illustrating a launch of a wizard for requesting a hierarchical mapping according to one embodiment. As shown, the user may be presented with a graphical element, e.g., a drop down menu 1150 in response to a "right" click of a mouse on a selected source device 1151, to launch the wizard. Upon selecting the option titled "Map" in drop down menu 1150, the first panel of the wizard may be displayed. FIGS. 12a-12d are block diagrams illustrating exemplary graphical views of several steps through which a wizard may guide a user requesting a hierarchical mapping, according to one embodiment. As shown in FIG. 12a, the first window 1210A displayed upon a launch of the wizard may display a "Welcome" message. The user may be invited to continue to the next step by clicking on a "Next" button 1220.

Figure 12B:
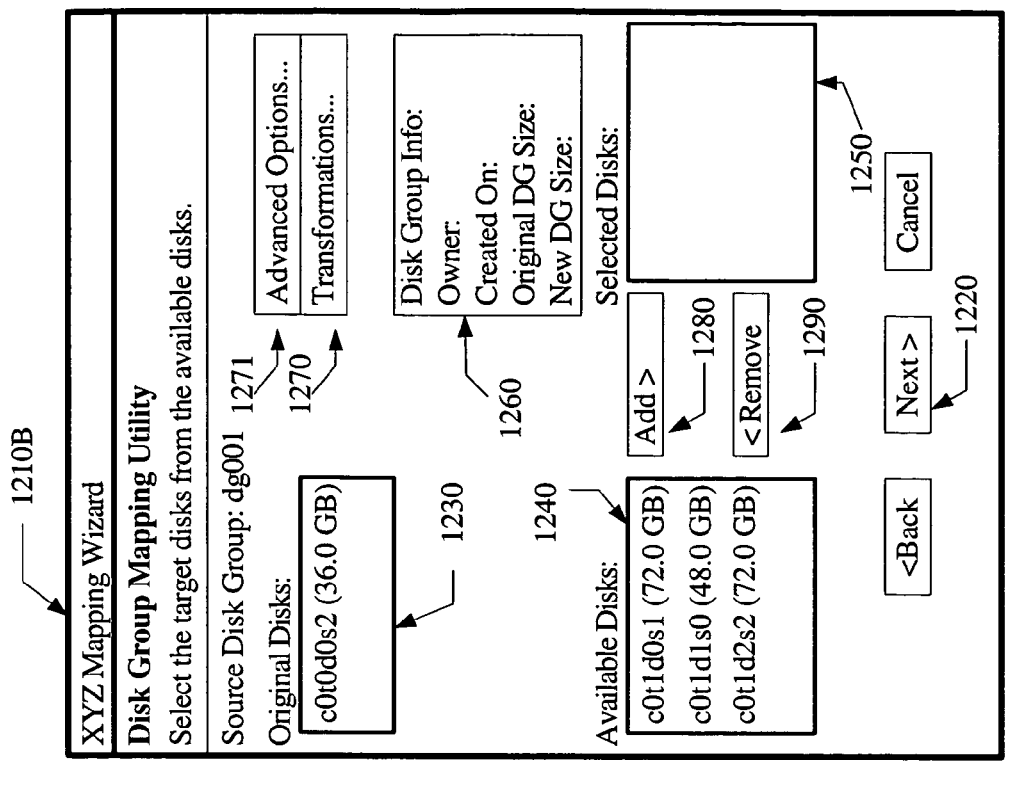
FIGS. 12a-12d are block diagrams illustrating exemplary graphical views of steps through which a wizard may guide a user requesting a hierarchical mapping, according to one embodiment.
Figure 12A:
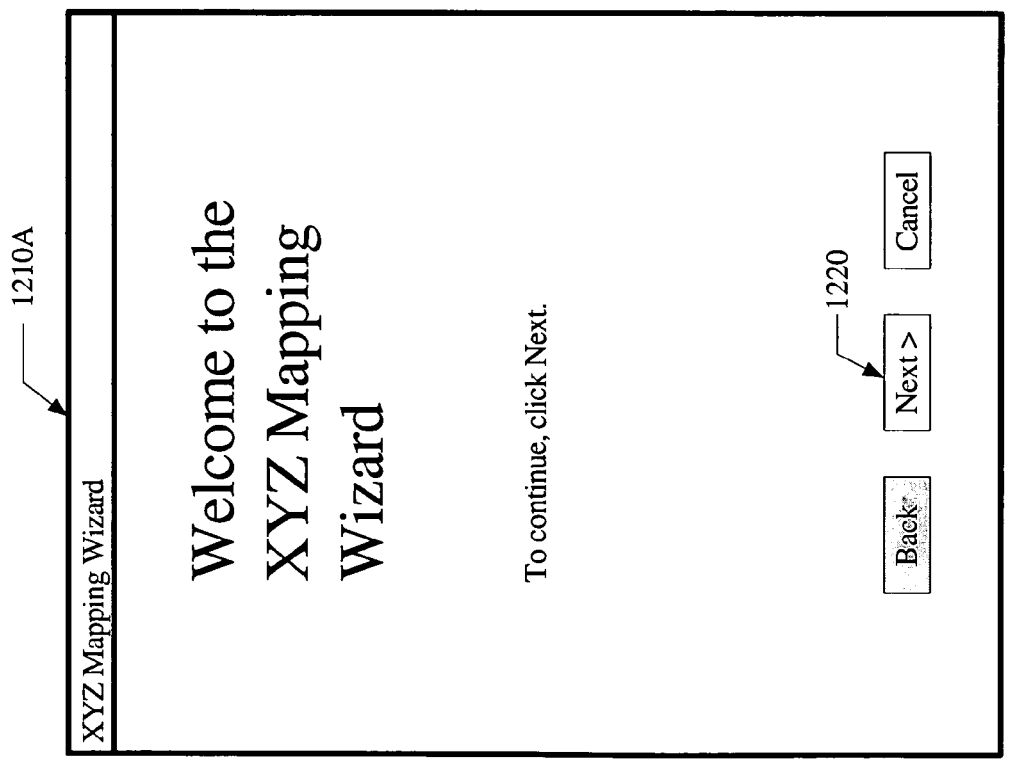

In the next step, as shown in FIG. 12b, a window 1210B that includes information about source and potential target storage devices may be displayed. The exact contents of window 1210B may differ depending upon the specified source storage device 1151: for example, different source storage devices may be displayed if source storage device 1151 is a disk group 110 than if source storage device 1151 is a disk. In the depicted embodiment, source storage device 1151 is a disk group "dg001". Information about devices contained within source storage devices (e.g., disk "DiskA") may be displayed within box 1230 of window 1210B. Potential target devices (which may correspond to a set of target storage devices selected prior to the launch of the wizard, or may be obtained from target device configuration 213 without an explicit selection by the user) may be displayed in box 1240 of window 1210B. Buttons labeled "Add" (1280) and "Remove" (1290) may be provided to allow user to specify the target devices to be used for the mapping, from among the potential target devices shown in box 1240. Selected target storage devices may be moved to box 1250 upon clicking on "Add" button 1280. Additional information about the source storage device, such as the name of an owner, creation date information, and size information, may be displayed in box 1260.

A buttons 1271 may also be provided to allow a user to specify one or more advanced options for the requested mapping. Advanced options may include, for example, the ability for a user to specify certain source and/or target storage devices (from among the specified source and/or target storage devices or hierarchies) that should not be mapped, to specify special configurations like cross-platform data sharing. or to change one or more attributes such as a name or a size of a source storage device. In some embodiments, a user may also specify one or more transformations (e.g., using the "Transformations . . . " button 1270 of FIG. 12b) to be performed or applied to the source storage device, or to the source storage device and each of its contained storage devices, during a requested mapping. For example, a user may request that the size of each source storage device (i.e., the specified source storage device and each of its contained storage devices) be changed during the mapping, e.g., that the size be doubled. If such a transformation is requested, and if remapping software 330 determines that the requested transformation is feasible (e.g., if enough space is available on the target storage devices in the case where the transformation requested is a doubling in size), the requested transformation may be applied during the mapping.

Figure 12D:
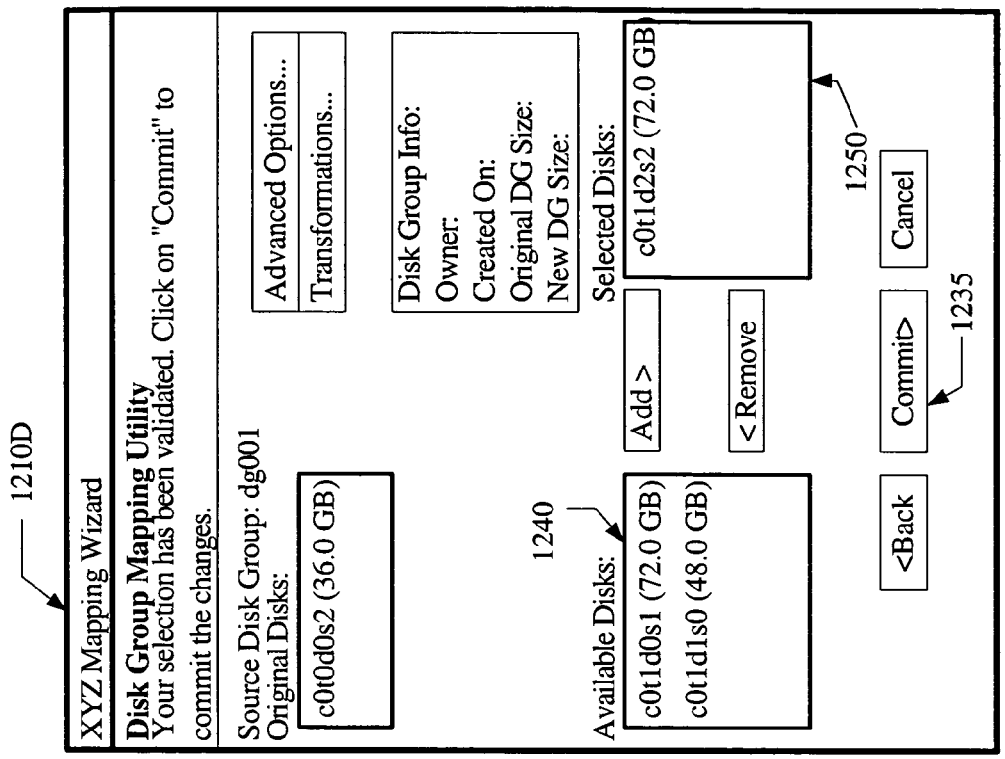
Figure 12C:
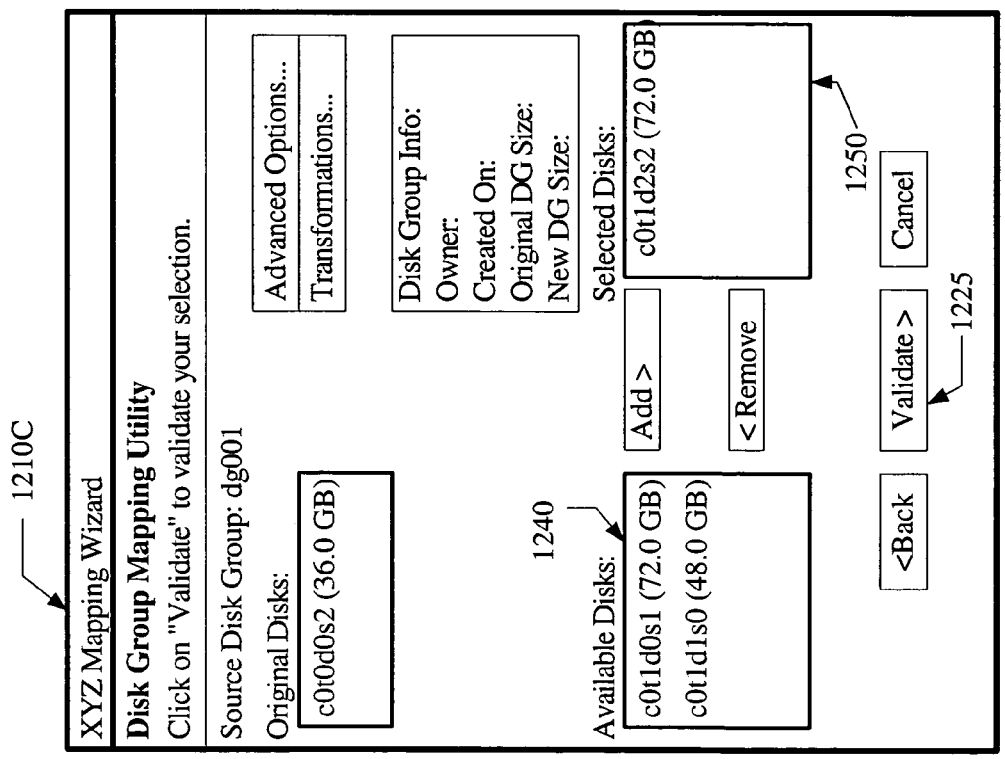

After selecting and adding the desired target storage devices, the user may proceed to the next step by clicking on "Next" button 1220 of FIG. 12b. As shown in FIG. 12c, the next window displayed (1210C) by the wizard may allow the user to request a validation of the specified mapping request, e.g., by using a button 1225 labeled "Validate". As described below in further detail, command interface 320 may utilize remapping software 330 to perform one or more validity checks to verify whether the requested mapping is valid or feasible. If the requested mapping is found to be valid, a window 1210D may be displayed in the next step, as shown in FIG. 12d, which allows the user to request a "commit" of the mapping (e.g., using button 1235). A commit request may then be sent to remapping software 330, which may perform the desired mapping of the source storage device and its contained storage devices. The committed mapping may be provided as input to device restore software 215 and data restore software 216, to allow any needed devices to be created at target storage devices 252 and populated with data from backup image 242.

In one embodiment, a quick map feature may be provided (e.g. as a menu item under the action menu activated by a right click of a mouse), in addition to the "drag and drop", copy and paste, and wizard-based interfaces described above. The quick map feature may be provided to automatically map the selected storage hierarchy to one or more target storage devices without further interaction from the user; for example, such a quick map feature may be used when the target storage devices 252 are identical to the source storage devices.

The ability to validate a proposed mapping request, as described above, may be used by a user to experiment with various possible mappings and to choose any desired valid mapping. That is, a user may try out a number of possible combinations of source and target storage devices before selecting one for a commit. Although the ability to try out combinations has been described in the context of a graphical user interface in the form of a wizard, equivalent functionality may be provided using other interfaces (including a "drag and drop" interface, a "cut and paste" interface, or a command-line or text-based interface).

It is noted that many variations on the graphical user interfaces described are possible. For example, a variety of different icons or other graphical elements may be used to illustrate a storage device and/or a storage hierarchy in different embodiments. In addition, various panels and windows displayed, e.g., the panels illustrated in FIG. 6, may be arranged in a different configuration relative to each other than the configurations depicted herein. It is also noted that some elements of the graphical user interface functionality described above may not be part of mapping tool 211 itself. For example, the ability to select objects using a "left" mouse click, or to "drag and drop" selected objects, may be functionality supported by part of the underlying operating system or user interface (e.g. Windows™, XWindows for Unix-type systems, etc.).

In addition to the graphical user interfaces described above, a text-based or command-line interface may also be provided by mapping tool 211 in some embodiments. For example, mapping tool 211 may be invoked or started up by issuing a command such as "maptool -source <source_cfg_file> -target <target_cfg_file> <commandName> <commandOptions>", in which command-line parameters "source_cfg_file" and "target_cfg_file" may be used to identify source hierarchy configuration 212 and target device configuration 213, respectively, and "commandName" may be used to specify a specific command with a list of options specified via "commandOptions". Specific commands may include a command to provide a representation or listing of source storage devices within a source storage hierarchy 101, a command to provide a listing of target storage devices 252 or devices contained in a target storage hierarchy 101, a command to validate a proposed mapping, or a command to commit a mapping. Command options may include, for example, identification of a source storage device and target storage devices, advanced options or transformations as described above for the wizard-based graphical user interface. In general, a command-line interface may provide functionality equivalent to any of the graphical user interfaces described above. In some embodiments, input provided by a user using a graphical user interface may be translated into equivalent text commands (e.g., commands formatted according to a command-line interface) before being executed by remapping software 330. In other embodiments, both graphical and text-based interfaces may be provided by mapping tool 211: for example, source storage hierarchy interface 310 may be a graphical user interface, and command interface 320 may be either text-based or graphical.

Command interface 320 (which may be graphical or text-based, as described above) may provide the hierarchical mapping request, including identifications of the selected source and target storage devices, as input to remapping software 330. Remapping software 330 may be configured to look up the details of the specified source and target devices, for example in source hierarchy configuration 212 and target device configuration 213, in preparation for performing the requested mapping. Information related to the types of storage devices specified (i.e., whether the devices are disk groups 110, disks 120, volumes 130, volume sets 135 or file systems 140), their sizes, their containment relationships with each other, etc., may be obtained by remapping software 330 from the source hierarchy configuration 212 and target device configuration 213. In some embodiments, as described earlier, remapping software 330 may be configured to verify the validity of the requested mapping, that is, whether the requested mapping violates any of one or more validity requirements or constraints. A variety of validity checks may be performed by remapping software 330 in different embodiments, and the validity requirements to be checked may be specified either explicitly by a user, or implicitly within remapping software 330. Explicitly specified validity requirements may be specified using any suitable mechanism, such as via a parameter file or as environment variables. If a request is identified as being invalid, a warning or error message may be provided to the user indicative of the invalidity of the request, as depicted in block 440 of FIG. 4.

A first type of validity check may verify that the types of the selected source and target storage devices are acceptable for performing a mapping. For example, a request to map a disk group 110 to a volume 130 may be rejected as an invalid request, as a disk group may contain multiple disks 120, each of which may itself contain multiple volumes 130. In some cases, operating system requirements may make a requested mapping invalid. For example, some operating systems such as versions of Microsoft Windows™, may include a requirement that partitions and other types of volumes are not mixed on the same storage device and a requirement that a maximum of 4 primary partitions are included on the same storage device. The virtualization features supported, or supportable by, source and target storage devices may also help determine the validity of a requested mapping. For example, in some embodiments, a request to map a source logical volume 130 consisting of four mirrors (or four mirrored plexes), where each mirror is on a different source disk 120, to a target set of three disks, may be identified as an invalid mapping request (because it may not be possible to create a four-mirror volume at the specified targets). (It is noted that in other embodiments, a request to map a four-way mirrored volume 130 to a three-disk target may be considered a valid mapping request. Remapping software 330 may be configured to map one mirror to each of the specified target disks, and to send a warning indicating the reduction in the number of mirrors to the user.) In some embodiments, command interface 320 may be configured to perform type validity checking, or to allow only valid source and target storage device combinations to be selected. For example, if a graphical user interface is being used, a selection of a particular type of storage device (such as a disk group 110) as a source for a mapping request may result in one or more invalid target storage devices (e.g., volumes 130) being "greyed out" or disabled for selection as targets.

A second type of validity check may be used to verify that enough storage space is available at the target storage devices. For example, if a source storage device is a disk 120 of size 100 GB, and all of the storage within the source disk is being used, and a selected target storage device is a disk of size 20 GB, it may not be possible to perform the requested mapping. Remapping software 330 may be configured to look up the details of source and target storage devices provided, for example, in source hierarchy configuration 212 and/or target device configuration 213, to perform such space validation checks.

A third type of validity check may be used to identify incomplete containment of source storage devices. During its analysis of specified source storage devices, remapping software 330 may build a list of contained storage devices that are also to be mapped as part of the requested hierarchical mapping operation—for example, if a disk 120 is selected as the source storage device, its contained volumes 130 and file systems 140 may be included in such a list. However, as shown in FIG. 1, a given volume 130D may span more than one disk 120 (in the depicted example, volume 130D spans disks 120B and 120C). If a storage device such as disk 120B, that contains only part of a second storage device such as volume 130D, is selected as a source storage device for a hierarchical mapping operation, remapping software 330 may be configured to respond in accordance with a specified containment violation handling policy.

A containment violation handling policy may specify one or more actions to be taken by remapping software 330 upon a detection of an incomplete containment of the kind described above. The containment violation handling policy may be specified to mapping tool 211 in a variety of different ways in different embodiments: for example, it may be specified as part of configuration metadata in a parameter file, by a command-line input parameter passed to mapping tool 211 on startup, or by environment variables. According to a first containment violation handling policy, which may be termed "full_containment_only", only those storage devices that are fully contained within the specified source storage device may be included in the hierarchical mapping. In the present example, if a "full_containment_only" policy were in use, volume 130D would not be considered for mapping if disk 120B were selected as the source storage device, because volume 130D is not fully contained within disk 120B. In some embodiments, remapping software 330 may be configured to provide a warning or error message to a user upon a detection of a containment violation (e.g., "WARNING: Device X is not fully contained within device Y. Device X will not be mapped"), which may be provided as a log message, displayed using a graphical user interface, etc.

In another embodiment, a different containment violation handling policy, which may be termed "partial_containment_allowed", may be employed. In such an embodiment, when a specified source storage device such as disk 120B contains only part of a storage device such as volume 130D, remapping software 330 may be configured to attempt to include one or more additional source storage devices, such as disk 120C, in the mapping, in order to ensure that all of the partly contained device gets mapped. Remaining validity checks, such as the space validation check and the storage device type check described above indicate, may then be applied to the additional device (and to its own hierarchy of contained devices, if any). If the combination of the originally specified source storage device and the additional source storage devices passes the validity checks, the additional source storage devices may be included in the mapping. Thus, in embodiments employing a "partial_containment_allowed" policy, additional storage devices such as disk 120C, which may not form part of a storage hierarchy rooted at the specified source storage device such as disk 120B, may be mapped to target storage devices 252.

In addition to checking the validity of a requested hierarchical mapping based on storage device types, storage space considerations, and containment considerations as described above, additional forms of validity checking may also be employed in some embodiments. In one embodiment, remapping tool 330 may also check for name space collisions between source and target storage devices, as described above, i.e., remapping tool 330 may check whether source and target storage devices of the same type have identical names. For example, a name space collision may be detected if a user requests a mapping from a source disk 120A to a target disk 120K, where source disk 120A contains a volume named "vol001", and target disk 120K also contains a pre-existing volume named "vol001". In one embodiment, remapping tool 330 may be configured to attempt to perform a mapping of a source storage device to the target storage device with the identical name. For example, if enough space is available on the target disk, pre-existing volume "vol001" may be enlarged to accommodate the data of source volume "vol001", i.e. data of the source storage device may be merged with the pre-existing target storage device. However, different virtualization characteristics, such as different stripe unit sizes or different mirroring configurations, may prevent a successful merge between identically named source and target storage devices, which may result in the requested mapping being considered invalid by remapping software 330. In another embodiment, such merge operations may be disallowed, i.e., remapping tool 330 may be configured to provide a warning or error message indicating an invalid mapping request if a name space collision is detected. Other constraints or validity requirements to be checked may be specified by users: for example, in one embodiment, only source storage devices owned by a specified user group or individual user may be mapped. Users may also explicitly limit the set of validity checks or the constraints checked during validity checking, and may also disable validity checking entirely in some embodiments.

As described above, after the validity of a requested mapping has been verified, a user may be asked to commit the mapping. In one embodiment, after receiving a request to commit a mapping, remapping software 330 may step through a list or set of identified source storage devices of a source storage hierarchy 101, and map each source storage device to storage within the target storage device or devices. The source storage devices may be traversed and mapped using a breadth-first traversal, a depth-first traversal, or a combination of breadth and depth-first traversals of source storage hierarchy 101, or in some other order such as the order in which devices are displayed. For example, in one embodiment using depth-first traversal, remapping software 330 may map a parent storage device (such as a disk 120) and then map contained storage devices of the parent storage device (e.g., volumes 130 contained within disk 120, and file systems contained within volumes 130) before returning to map other devices at the level of the parent storage device (e.g., other disks). In another embodiment using breadth-first traversal, remapping software 330 may map all parent storage devices at a given level of source storage hierarchy 101 (e.g., all disks 120) before mapping contained devices of the parent storage devices. As it traverses the set of source storage devices, remapping software 330 may be configured to find space in the target storage devices 252 to which a source storage device is to be mapped using a "first-fit" algorithm in one embodiment. That is, in performing the mapping, remapping software may use as much space of a given target storage device 252 as possible before moving on to a next target storage device. In other embodiments, remapping software 330 may use a "best-fit" algorithm in which all or several of the source storage devices are considered for mapping together rather than singly, in order to optimize the mapping based on one or more user-selected attributes, such as availability or performance. For example, if a best-fit mapping is desired based on enhanced availability, remapping software 330 may be configured to organize target storage devices as mirrored or RAID-5 volumes before performing the mapping.

A committed mapping may be provided as input to device restore software 215 and data restore software 216, to allow any needed devices to be created at target storage devices 252 and populated with data from backup image 242. In some embodiments, it may also be possible to save a representation of a committed mapping, for example in the form of an XML file or in a database, instead of or in addition to completing a restoration (i.e., instead of creating any required devices using device restore software and copying data using data restore software 216). Such a saved representation of a hierarchical mapping may be used for various purposes: for example, to maintain a history of mapping operations, to replicate a restoration at multiple sets of target storage devices, etc. In addition, during operation, mapping tool 211 may create one or more temporary representations of requested mappings (including mappings that were later deemed invalid). For example, mapping tool 211 may store a temporary representation in memory on the computer system on which mapping tool 211 is executing, and/or on a storage device in the computer system. In some embodiments, a user may also request copies of such temporary representations (which may be used in reports detailing why a requested mapping was not feasible, etc.). It is noted that in one embodiment, validation checks may not be performed by mapping tool 211, i.e., the steps illustrated in blocks 430 and 440 of FIG. 4 may be eliminated; while in other embodiments, one or more validation checks may be performed after a user requests a commit, rather than before the commit is requested.

It is also noted that in some embodiments, discovery software 214 may be triggered or activated by mapping tool 211, instead of being activated prior to an invocation of mapping tool 211. Thus, for example, target storage hierarchy view 640 and/or target detail view panel 530 shown in FIG. 6 may be populated only after mapping tool 211 invokes discovery software 214 to obtain target device configuration 213 from target 250.

As used herein, a graphical view of a storage hierarchy or a set of storage devices may refer to a representation of the storage hierarchy or storage devices, where at least a portion of the representation is provided pictorially on a display device using one or more graphical elements. Each graphical element may be a pictorial representation (that is, at least a portion of its meaning is derived from its appearance on the screen). Graphical views and graphical elements may contain text as well. In addition, as used herein, the term "user" may refer to a human interacting with mapping tool 211 and other depicted software, and may also refer to a program (e.g., utilizing a shell script) or device configured to use mapping tool 211.

It is noted that the term "volume" may refer to any defined amount of storage on one or more storage devices. In addition to its size and the storage device or device on which it is allocated, a volume may, in some cases, have other attributes (e.g. protection/performance features such as mirroring, striping, RAID level, spanning or concatenation etc.). The term volume may include, for example, logical volume as used in Unix-type operating systems such as Linux, AIX from IBM Corp., Solaris from Sun Microsystems, etc. The term volume may also include, for example, a volume as defined by various volume manager software such as VERITAS Volume Manager™ from VERITAS Software Corporation. The term volume may further include a partition as used, e.g., in the Microsoft Windows™ and/or disk operating system (DOS) operating systems. A partition may be a division of storage on a single disk drive, isolating the partitioned storage from other storage on the disk drive. Partitions may be primary or extended. The term volume may further refer to volume groups.

Source 245 and target 250 may each comprise a computer system capable of hosting one or more storage devices (such as disks 120) or a storage hierarchy 101. For example, in one embodiment a source 245 (or a target 250) may be a server computer system, including one or more processors, one or more system memories, and one or more disks or other storage devices, where the server system is configured to execute software such as one or more operating systems and/or frozen image applications. In another embodiment, a source 245 or a target 250 may be a client computer system such as a single-user workstation. It is noted that storage devices other than disks, such as tape drives, CD-ROM drives, flash memory devices, etc., may also form part of a storage hierarchy 101 in some embodiments.

The above description has provided various details for embodiments of mapping tool 211 used to map a source storage device of a source storage hierarchy 101, and its contained storage devices, to one or more target storage devices 252 in the context of a system restoration server 210. However, other embodiments of mapping tool 211 may also be used in other environments. For example, mapping tool 211 may be used in a volume manager product. The source storage hierarchy 101 may be the current configuration of storage devices on a computer system managed by the volume manager. The target storage devices 252 may be used to implement a potential modification to the current configuration that is being modeled by the user, e.g., using advanced options and/or transformations described in conjunction with the description of FIG. 12*b*. Once the user commits the mapping implementing the desired modifications, the modified storage devices may be created and populated on the computer system, or on another target computer system. Similarly, a file system product may use mapping tool 211 to modify the distribution of file systems to volumes, or the characteristics of the volumes underlying one or more file systems.

In another embodiment, mapping tool 211 may be used in a provisioning system (e.g. the VERITAS OpForce™ product). A provisioning system maintains a set of images of software resources for computer systems (including operating system, application software, etc.) and may remotely provision a computer system with a selected image. Typically, the images are created by installing the desired software on a computer system (either through provisioning or manual installation) and a snapshot of the disk(s) in the computer system is taken to capture the image. If a new image is desired, a system is provisioned and a new snapshot is taken. Using mapping tool 211, part or all of an image to be modified may be displayed or represented as the source storage hierarchy 101, and the desired modifications specified by a user.

In yet another embodiment, configuration software (for either software installation, such as Microsoft Windows™ add/delete software function, or for hardware configuration, such as various hardware configuration wizards) may employ mapping tool 211. The source storage hierarchy 101 may be a default configuration/installation, and the user may customize a desired new configuration. Mapping tool 211 may also be used as a standalone tool for a system administrator to determine whether one or more desired mappings are feasible, or may be used in other tools such as a frozen image service.

Figure 13:
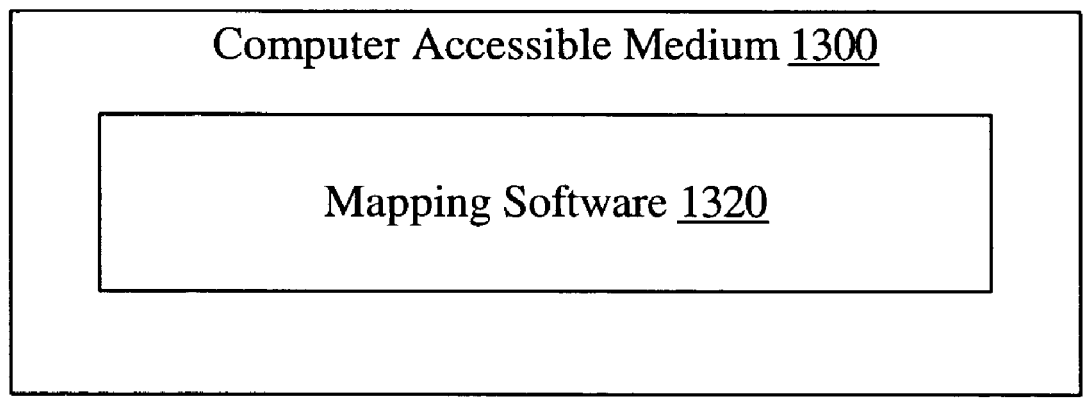
FIG. 13 is a block diagram illustrating a computer-accessible medium.

FIG. 13 is a block diagram of one embodiment of a computer accessible medium 1300, comprising mapping software 1320 including instructions which, when executed, implement the functionality of mapping tool 211 described above. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer accessible memory medium comprising program instructions for implementing a mapping tool, wherein the program instructions are executable to implement:
    a storage hierarchy representation interface configured to provide a user with a first representation of a source storage hierarchy and a second representation of one or more target storage devices, wherein the source storage hierarchy includes a source storage device with one or more contained storage devices;
    a command interface allowing the user to request a hierarchical mapping of the source storage device to at least a subset of the one or more target storage devices; and
    remapping software;
    wherein, in response to the request for the hierarchical mapping, the remapping software is configured to:
        determine whether the requested hierarchical mapping violates a validity requirement;
        provide an indication of an invalidity of the requested hierarchical mapping in response to a determination that the requested hierarchical mapping violates the validity requirement; and
        create the requested hierarchical mapping of the source storage device and each of the one or more contained storage devices to the at least a subset of the one or more target storage devices, in response to a determination that the requested hierarchical mapping does not violate the validity requirement.

2. The computer accessible memory medium as recited in claim 1, wherein the storage hierarchy representation interface is a graphical user interface comprising:
    a first graphical view of the source storage hierarchy; and
    a second graphical view of the one or more target storage devices.

3. The computer accessible memory medium as recited in claim 2, wherein the command interface is a graphical user interface comprising a graphical mechanism to specify the source storage device and the at least a subset of the one or more target storage devices.

4. The computer accessible memory medium as recited in claim 3, wherein the graphical mechanism comprises a drag and drop mechanism.

5. The computer accessible memory medium as recited in claim 3, wherein the graphical mechanism comprises a wizard configured to guide a user through a set of steps to request the hierarchical mapping.

6. The computer accessible memory medium as recited in claim 2, wherein the one or more target storage devices form part of a target storage hierarchy, and wherein the graphical user interface further comprises a third graphical view of the target storage hierarchy.

7. The computer accessible memory medium as recited in claim 1, wherein the command interface is a command-line interface configured to accept text input.

8. The computer accessible memory medium as recited in claim 1, wherein the request includes a transformation operation to be applied to the source storage device and the one or more child storage devices during the mapping.

9. The computer accessible memory medium as recited in claim 8, wherein the transformation operation is a change in size.

10. The computer accessible memory medium as recited in claim 1, wherein the source storage device is a disk group.

11. The computer accessible memory medium as recited in claim 1, wherein the source storage device is a disk.

12. The computer accessible memory medium as recited in claim 1, wherein the source storage device is a logical volume.

13. A system comprising:
    a processor;
    one or more target storage devices; and
    a memory medium coupled to the one or more processors, wherein the memory medium stores a mapping tool and a source storage hierarchy;
    wherein the source storage hierarchy includes a source storage device with one or more contained storage devices; and
    wherein, in response to a request for a hierarchical mapping, the mapping tool is executable by the processor to:
        verify whether the requested hierarchical mapping violates a validity requirement in response to a request for the hierarchical mapping;
        provide an indication of an invalidity of the requested hierarchical mapping prior to initiating a creation of the mapping, in response to a detection of a violation of the validity requirement; and
        create the requested hierarchical mapping of the source storage device and each of the one or more contained storage devices to at least a subset of the one or more target storage devices, in response to a verification of the hierarchical mapping.

14. The system as recited in claim 13, wherein the mapping tool is further executable by the processor to provide a graphical user interface comprising:
   a first graphical view of the source storage hierarchy; and
   a second graphical view of the one or more target storage devices.

15. The system as recited in claim 14, wherein the graphical user interface further comprises a graphical mechanism to specify the source storage device and the at least a subset of the one or more target storage devices.

16. The system as recited in claim 13, wherein the request includes a transformation operation to be applied to the source storage device during the mapping.

17. A method comprising:
   providing a first representation of a source storage hierarchy and a second representation of one or more target storage devices, wherein the source storage hierarchy includes a source storage device with one or more contained storage devices;
   receiving a request for a hierarchical mapping of the source storage device to at least a subset of the one or more target storage devices;
   determining whether the requested hierarchical mapping violates a validity requirement;
   creating a mapping of the source storage device and each of the one or more contained storage devices to storage within the at least a subset of the one or more target storage devices, in response to determining that the requested hierarchical mapping does not violate the validity requirement;
   providing an indication of an invalidity of the mapping prior to initiating a creation of the mapping, in response to determining that the requested hierarchical mapping violates the validity requirement.

18. The method as recited in claim 17, further comprising:
   providing a graphical user interface including:
      a first graphical view of the source storage hierarchy; and
      a second graphical view of the one or more target storage devices.

19. The method as recited in claim 18, wherein the graphical user interface includes
   a graphical mechanism to specify the source storage device and at least a subset of the one or more target storage devices.

20. The method as recited in claim 17, wherein the request includes a transformation operation to be applied to the source storage device during the mapping.

21. A computer-accessible memory medium comprising program instructions, wherein the program instructions are executable to:
   provide a first representation of a source storage hierarchy and a second representation of one or more target storage devices, wherein the source storage hierarchy includes a source storage device with one or more contained storage devices;
   receive a request for a hierarchical mapping of the source storage device to at least a subset of the one or more target storage devices; and
   verify whether the requested hierarchical mapping violates a validity requirement;
   provide an indication of an invalidity of the requested hierarchical mapping prior to initiating a creation of the mapping in response to a detection of a violation of the validity requirement; and
   create the requested hierarchical mapping of the source storage device and each of the one or more contained storage devices to storage within the at least a subset of the one or more target storage devices, in response to a verification of the hierarchical mapping.

22. The computer-accessible memory medium as recited in claim 21, further comprising program instructions executable to:
   provide a graphical user interface including:
      a first graphical view of the source storage hierarchy; and
      a second graphical view of the one or more target storage devices.

23. The computer-accessible memory medium as recited in claim 22, wherein the graphical user interface includes a graphical mechanism to specify the source storage device and at least a subset of the one or more target storage devices.

24. The computer-accessible memory medium as recited in claim 21, wherein the request includes a transformation operation to be applied to the source storage device during the mapping.

* * * * *